May 12, 1936.  A. J. PETERMAN  2,040,793

PINION SHAFT BEARING

Filed April 22, 1935

INVENTOR:
Albert J. Peterman,
by Carr Kerr & Gravely,
HIS ATTORNEYS.

Patented May 12, 1936

2,040,793

UNITED STATES PATENT OFFICE 2,040,793

PINION SHAFT BEARING

Albert J. Peterman, Canton, Ohio, assignor to The Timken Roller Bearing Company, Canton, Ohio, a corporation of Ohio Application April 22, 1935, Serial No. 17,624

3 Claims. (Cl. 308—207)

My invention relates to the mounting of pinion shafts and is especially applicable to the mounting of driving pinion shafts of automotive vehicles. Such shafts are very commonly made with spiral bevel pinions that ought to be accurately enmeshed with the spiral bevel ring gear of the differential mechanism and firmly held against endwise movement in either direction. Heretofore these requirements have involved considerable difficulties and expense.

The principal object of the present invention is to devise a simple and comparatively inexpensive pinion shaft mounting which is readily adjustable and which firmly holds the pinion shaft in adjusted position. The invention consists principally in making the outer raceway member of the bearing of such mounting with a circumferential flange, preferably in the form of a separate ring mounted on said member, and in clamping said outer raceway member so that the shoulder formed by said flange is seated against the housing nosing. The invention further consists in the pinion shaft bearing and in the parts and combinations and arrangements of parts hereinafter described and claimed.

Figure 1:
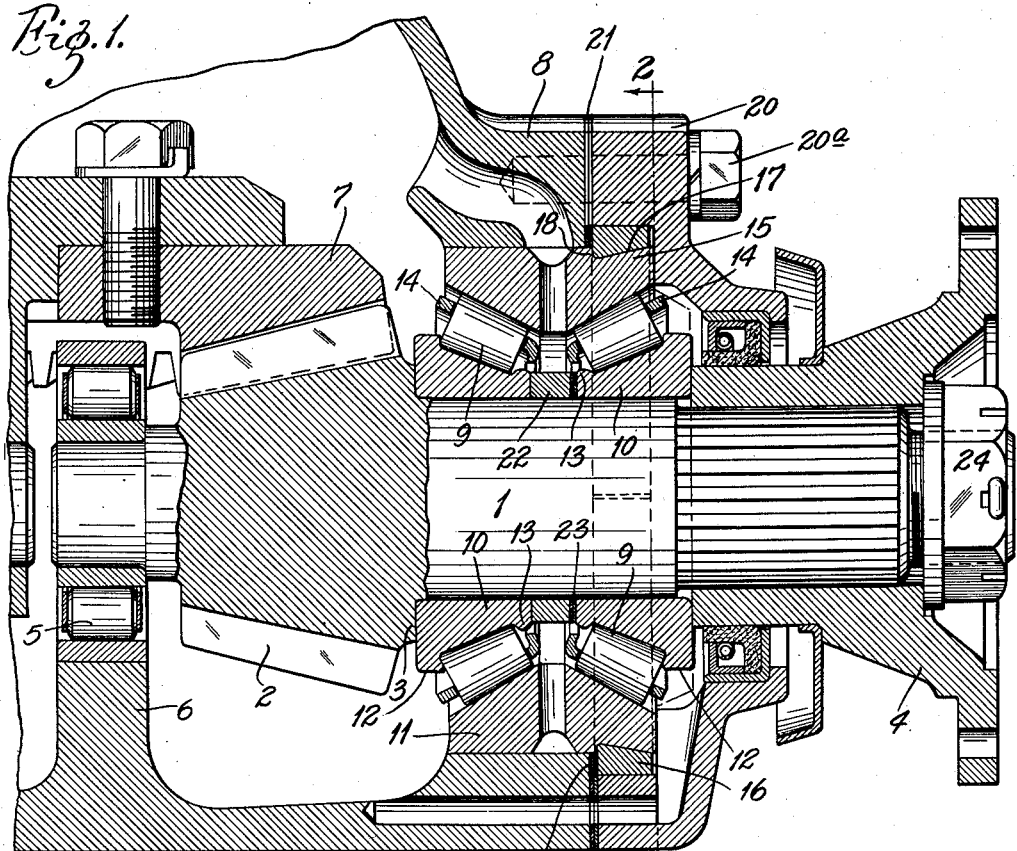
Figure 2:
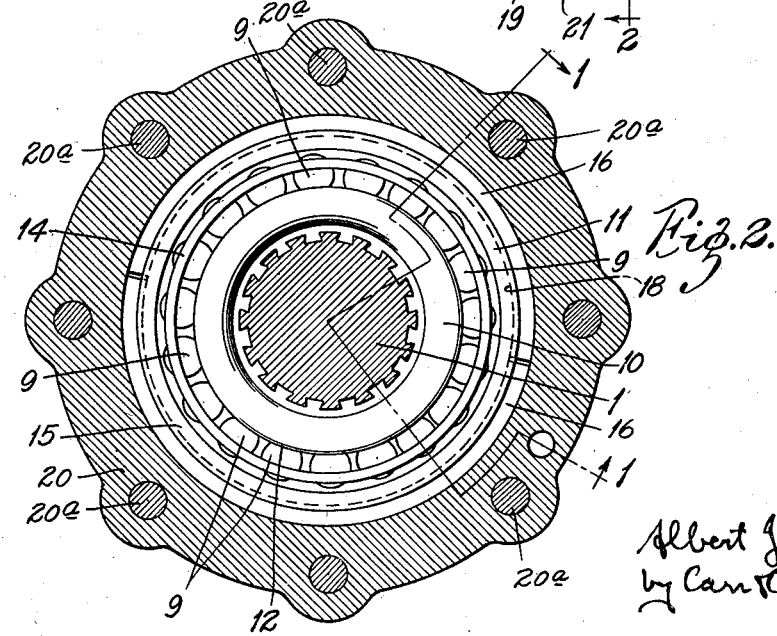

In the accompanying drawing, which forms part of this specification, and wherein like reference numerals refer to like parts wherever they occur, Fig. 1 is a longitudinal sectional view of a portion of an automotive driving axle provided with a pinion shaft bearing embodying my invention on the line 1—1 in Fig. 2; and Fig. 2 is a vertical cross-section on the line 2—2 in Fig. 1 on a reduced scale.

The construction illustrated in the accompanying drawing is a propeller or pinion shaft of an automotive vehicle with other parts closely associated therewith. The pinion shaft 1 has a spiral bevel pinion 2 integral therewith and the face of the hub at the large end of the bevel pinion constitutes a shoulder 3 that extends radially beyond the circumference of the adjacent portion of the shaft. One end of this shaft, hereinafter called the forward end, has a member 4 splined thereon for operatively connecting it to a motor (not shown) to be driven thereby. The other end of the shaft hereinafter called the rear end, is mounted in a plain, ball or cylindrical roller bearing 5 provided therefor in the differential carrier 6 of the axle housing. The spiral bevel pinion 2 is located close to the rear end of the shaft 1 and meshes with the spiral bevel gear 7 of an ordinary differential mechanism (not shown) mounted in the carrier 6 which forms part of the axle housing. The pinion shaft extends through the nosing 8 of the carrier; and an antifriction bearing, preferably a double roller bearing, is interposed between said shaft and such nosing of the axle housing.

The double roller bearing comprises two sets or rows of conical rollers 9 arranged in a circular series between inner raceway members 10 mounted on the shaft 1 and an outer raceway member 11 mounted in a cylindrical bore provided therefor in the housing nosing 8. The inner raceway members 10 have conical raceway surfaces that taper toward each other and are provided at their large ends with annular ribs or shoulders 12 and are also preferably provided with ribs 13 at the small ends of the raceway surfaces. Cages 14 of any suitable type are used to space the rollers 9 apart and keep them on the inner raceway member and the outer raceway member serves both rows of rollers, that is, it has two conical raceways that taper towards each other.

The outer end portion of the outer raceway member 11 projects beyond the end of the housing nosing and is provided with a reduced portion 15 of conical shape, said conical portion tapering toward said housing and its larger end being of substantially the same diameter as the outer diameter of the body of said raceway member. Mounted on said outer raceway member is a two part or split snap ring 16 having a tapering bore 17 that fits the conical portion 15 of said outer bearing member, the inner or rear end of said ring being seated against the shoulder 18 formed at the smaller end of said conical portion. Interposed between said ring and the end of the housing are shims 19 by means of which the pinion shaft 1 may be adjusted axially in said housing to properly enmesh the pinion 2 with the ring gear 7.

A clamping plate or ring 20, which is secured by screws 20a or otherwise to the housing, bears against the outer end of the outer raceway member 11 to hold it firmly against its conical seat 17 in the split ring 16. Preferably one or more compressible gaskets 21 are interposed between the margin of the plate 20 and the end of said housing to prevent leakage of oil at this point. By this arrangement, the outer raceway member is rigidly clamped in the housing against endwise movement, forward movement being prevented by closure plate 20 and rearward movement being prevented by the engagement of the ring 16 with the shims 19 backed by the forward end of the housing nosing 8.

As stated above, the two inner raceway members 10 are disposed with their small ends toward each other. With this arrangement, the large end of the rear inner raceway member abuts against the shoulder 3 formed by the large end of the pinion 2, while the large end of the forward inner raceway member is disposed in abutting relation to the inner end of the member 4 splined on the front end portion of the shaft 1. The bearing is adjusted by spacing members preferably in the form of a wide ring 22 and a plurality of thin shims 23 interposed between the small ends of the two inner raceway members 10; and said inner raceway members and spacer members are clamped between the shoulder 3 at the large end of the gear 2 and the inner end of the member 4 by means of a nut 24 threaded on the front end of the shaft 2.

The arrangement above described enables the pinion 2 to be positioned very accurately with respect to the ring gear 7 and the bearing and enables the parts of the bearing to be very accurately adjusted with respect to one another. In addition to radial load, the bearing takes care of end thrust in both directions with substantially no endwise play. The circumferential flange formed by the ring 16 at the end of the outer raceway member 11 permits the firm clamping of said raceway member in place between the end plate 20 and the housing. The arrangement also eliminates the necessity for shouldering the bore in which the outer raceway member is mounted; and it also dispenses with the use of a separate carrier for said raceway member. The parts are easy to manufacture and to fit properly together. As the end of the outer raceway member extends beyond the housing it is feasible to make the clamping ring 16 with a plain flat face, as distinguished from the ribs or other special devices used in this connection.

While I have described my invention as embodied in a pinion shaft provided with an ordinary spiral bevel gear, it is applicable to other shafts that are subject to end thrust and I do not wish to be restricted to such bevel gear construction. For instance, instead of being equipped with the conventional spiral bevel gear, the shaft might be equipped with an ordinary bevel gear or with a hypoid gear or with a worm gear. Likewise, while I have described my invention as embodied in bearings having two rows of rollers and balls, it is obviously applicable also to bearings with a single row of rollers or balls.

The rollers may be of any type that are suited to take care of both radial and axial load.

What I claim is:

1. The combination of a shaft, a support having a bore, an antifriction bearing interposed between said shaft and said bore and including an inner raceway member on said shaft and an outer raceway member having a portion mounted in said bore and having a conical projecting portion tapering toward said support, a ring member having a tapering bore seated on said conical portion and overlapping the end of said support, and a member secured to said end of said support opposite the conical projecting portion of said outer raceway member and constituting an abutment therefor.

2. The combination of a shaft, a support having a cylindrical bore, a roller bearing interposed between said shaft and said bore and including an inner raceway member on said shaft and an outer raceway member having a cylindrical portion mounted in said bore and having a reduced conical projecting portion tapering toward said support, a ring member having a tapering bore seated on said conical portion and overlapping the end of said support, an annular end closure plate secured to said end of said support opposite the conical projecting portion of said outer raceway member and constituting an abutment therefor, shims interposed between said end of said support and the inner end of said ring and compressible gaskets interposed between the opposing end faces of said support and said annular closure plate.

3. The combination of a shaft, a support having a bore, an interfriction bearing interposed between said shaft and said bore and including an inner raceway member on said shaft and an outer raceway member in said bore and having a portion projecting from the outer end thereof provided with a conical outer peripheral surface that tapers from the outer end of said raceway member toward said support, the diameter of the larger end of the conical portion of said outer raceway member being of substantially the same diameter as the outer diameter of the bore engaging portion of said outer raceway member, a ring having a tapering bore seated on said conical portion and overlapping said outer end of said support, and a member secured to said end of said support opposite the conical projecting portion of said outer raceway member and constituting an abutment therefor.

ALBERT J. PETERMAN.